April 8, 1952     J. SNYDER     2,592,203
RACK FOR HOLDING SLICES OF TOASTED BREAD AND THE LIKE
Filed Jan. 12, 1951
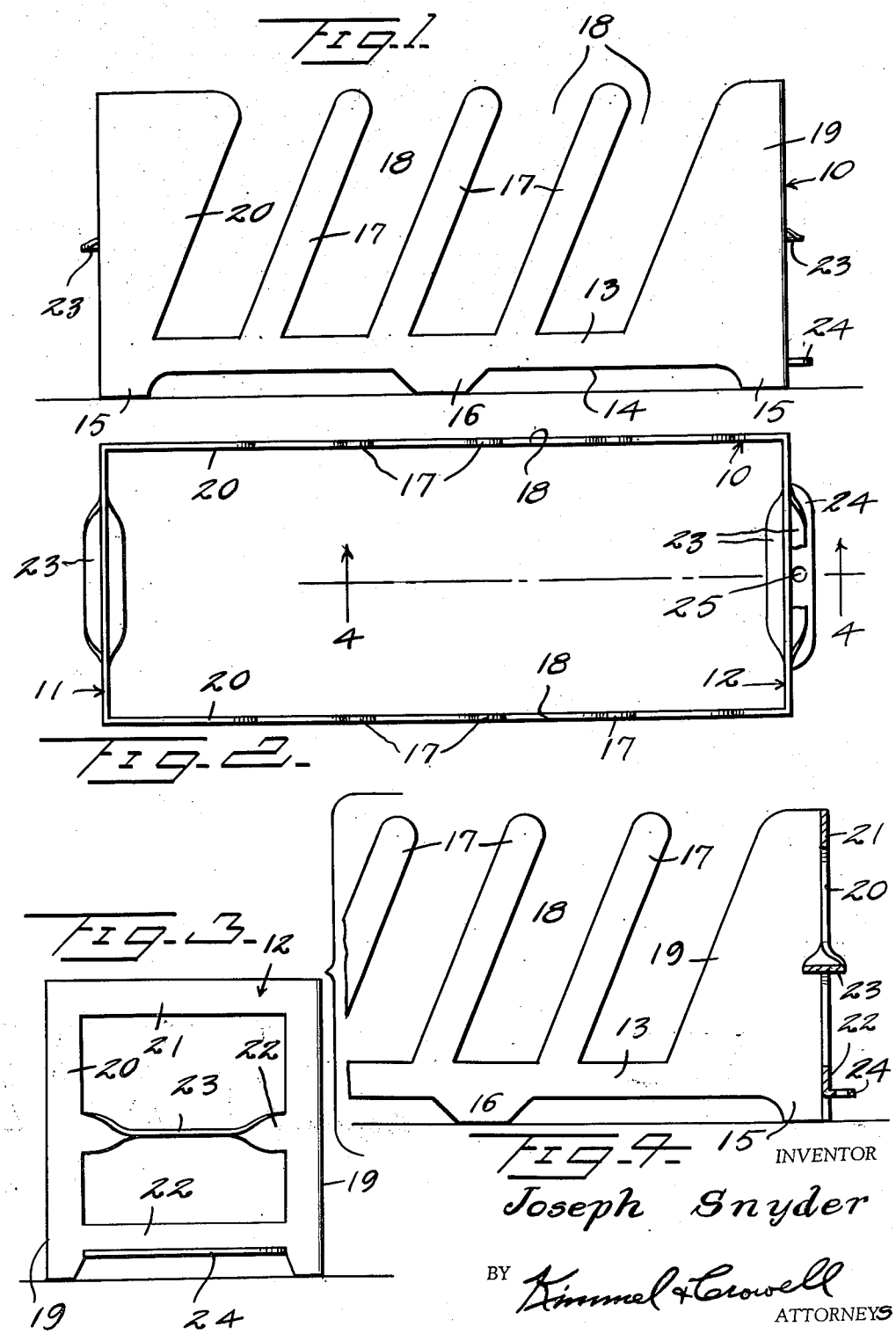
INVENTOR
Joseph Snyder
BY Kimmel & Crowell
ATTORNEYS Patented Apr. 8, 1952

2,592,203

UNITED STATES PATENT OFFICE 2,592,203

RACK FOR HOLDING SLICES OF TOASTED BREAD AND THE LIKE

Joseph Snyder, Washington, D. C.

Application January 12, 1951, Serial No. 205,623

2 Claims. (Cl. 211—13)

This invention relates to a rack or holder more especially intended for holding slices of freshly made toasted bread, but is adapted for use also as a holder or server for fresh bread, sliced cake, napkins, sliced vegetables and other food and household or restaurant items. Other and various uses than those specifically defined herein will become readily apparent from the construction and operation of the device as herein more particularly shown and described.

The device besides being functional is also at the same time decorative and is so constructed that it may be used either flat on a table or other horizontal surface or may be hung on a nail or the like against a vertical surface and obviously may be made to accommodate any desired number of articles, therefore not being limited to the number of spaces as shown.

Because fresh bread contains a great amount of moisture, it is of prime importance to allow for complete circulation of air around the slices of toast when they are taken from the toaster and as will be noted, my toast rack permits full circulation of air from every direction. The toast therefore, will be more palatable and tend to stay fresh much longer than if merely piled up or even if piled in layers between a cloth.

A further feature of my device is the angular arrangement for holding the slices as thereby, by use of the handles provided at each end of the device for such purpose, the toast may readily be carried about to the place of use or service without danger of dropping off or spilling due to the fact that the toast is held off center balance.

When bread is removed from a toaster the slices are fairly crisp, depending in great part upon the condition of the bread prior to being toasted. If the toasted slices are laid flat and one upon another, the slices have a tendency to become soft due to the inner moisture penetrating the toasted outer surface and condensing on such surface. It is an object of this invention to provide a rack for the toasted slices which will hold the slices in spaced apart relation so that air may freely circulate thereabout.

Another object of this invention is to provide a toast rack which may be disposed on either a horizontal or vertical position and which may be made out of metal, plastic or other material.

With the above and other objects in view, my invention consists in the arrangement, combination and details of construction disclosed in the drawing and specification, and then more particularly pointed out in the appended claims.

In the drawing:

Figure 1 is a detailed side elevation of a toast rack constructed according to an embodiment of this invention, Figure 2 is a plan view, partly broken away, of the device, Figure 3 is an end elevation of the device, Figure 4 is a fragmentary sectional view taken on the line 4—4 of Figure 2.

Referring to the drawing, the numeral 10 designates generally a pair of side members which are connected together by means of end members generally designated as 11 and 12. The side members 10 are formed of a lower bar 13 having a pair of cutouts 14 which form supporting feet 15 and 16.

Each side member 10 is provided with a plurality of obliquely inclined fingers or arms 17 which are longitudinally spaced apart in parallel relation and form spaces 18 within which a slice of toast is adapted to be loosely positioned. At one end of each side member 10 a truncated triangular wall 19 is provided, and at the opposite end an inverted truncated triangular wall 20 is provided. Each end member is formed of vertical bars 20 which may be integral with the side members 10 and with upper and lower connecting bars 21 and 22. An intermediate cross bar 23 is connected between the vertical bars 20 and is twisted or bent through an arc of 90° between the ends thereof so as to provide horizontally disposed handles 23. The end member 12 is identical with the end member 11, with the exception that the lower connecting bar 22 is formed with an outwardly projecting lip or lug 24 formed with an aperture 25. The aperture in the lug 24 provides a means whereby the rack may be disposed in suspended relation on the wall or other suitable support and may receive in this suspended relation toasted bread slices.

This rack may be made of any suitable length for holding the desired number of toasted slices and may be formed of metal, plastic or other suitable material.

As soon as the bread has been toasted the slice or slices are disposed in the spaces 18 so that the bread will be held in spaced apart relation in order that any moisture still remaining in the slice may dry out prior to the consumption of the slice.

I do not mean to confine myself to the exact details of construction herein disclosed, but claim all variations falling within the purview of the appended claims.

What I claim is:

1. A rack for toasted bread comprising a pair of upright side members, and end members connecting said side members together, each side member being formed with obliquely inclined slots extending downwardly from the upper edges thereof to thereby form opposed slice supporting arms, each of said end members comprising a pair of upright bars integral with said side members, upper and lower connecting bars fixed between said upright bars, and an intermediate bar fixed between said upright bars and formed with a twisted horizontal intermediate portion constituting a handle.

2. An article holding and dispensing rack comprising a unitary device having open vertical side and end walls, said side walls being of skeleton-like form and including horizontal base portions, and said end walls having cross-members portions of which are twisted out of the plane of said end walls to form horizontal surfaces for finger contact in transporting said rack, said side walls being each formed with a series of separator elements angularly disposed relative to said base portions, each element opposite a corresponding element of an opposite side wall.

JOSEPH SNYDER.

REFERENCES CITED

The following references are of record in the file of this patent:

UNITED STATES PATENTS

| Number | Name | Date |
| --- | --- | --- |
| 92,663 | Sherwood | July 13, 1869 |
| 601,753 | Kaiser | Apr. 5, 1898 |
| 1,065,000 | Sarter | June 17, 1913 |
| 1,557,950 | Wessermann | Oct. 20, 1925 |
| 1,563,000 | Wajer et al. | Nov. 24, 1925 |

FOREIGN PATENTS

| Number | Country | Date |
| --- | --- | --- |
| 520,000 | Great Britain | Apr. 11, 1940 |